(No Model.) 4 Sheets—Sheet 1.
C. R. WILLIAMS.
COIN CONTROLLED HEIGHT MEASURING MACHINE.
No. 383,608. Patented May 29, 1888.
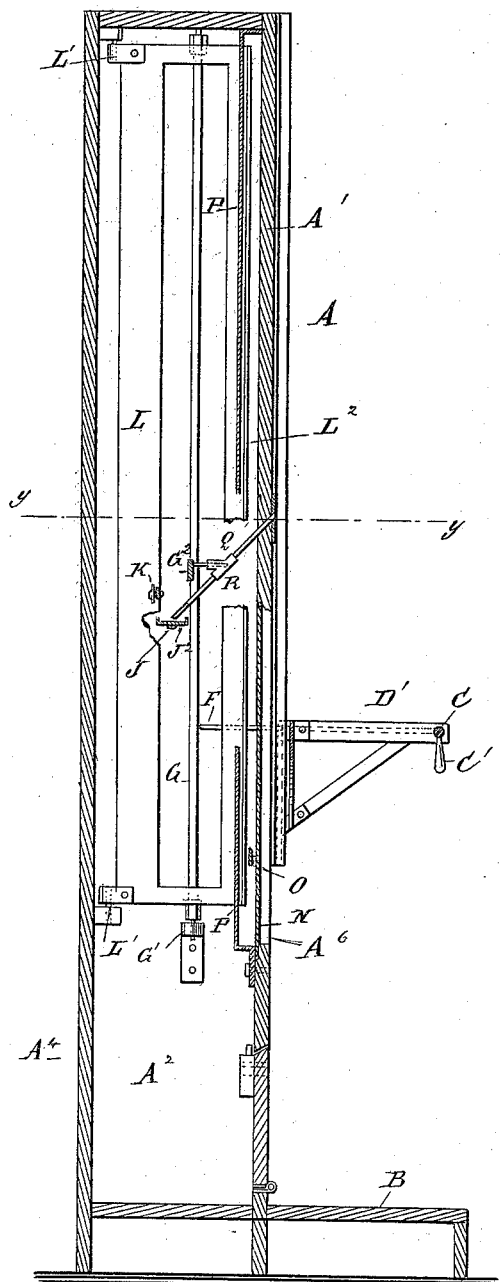
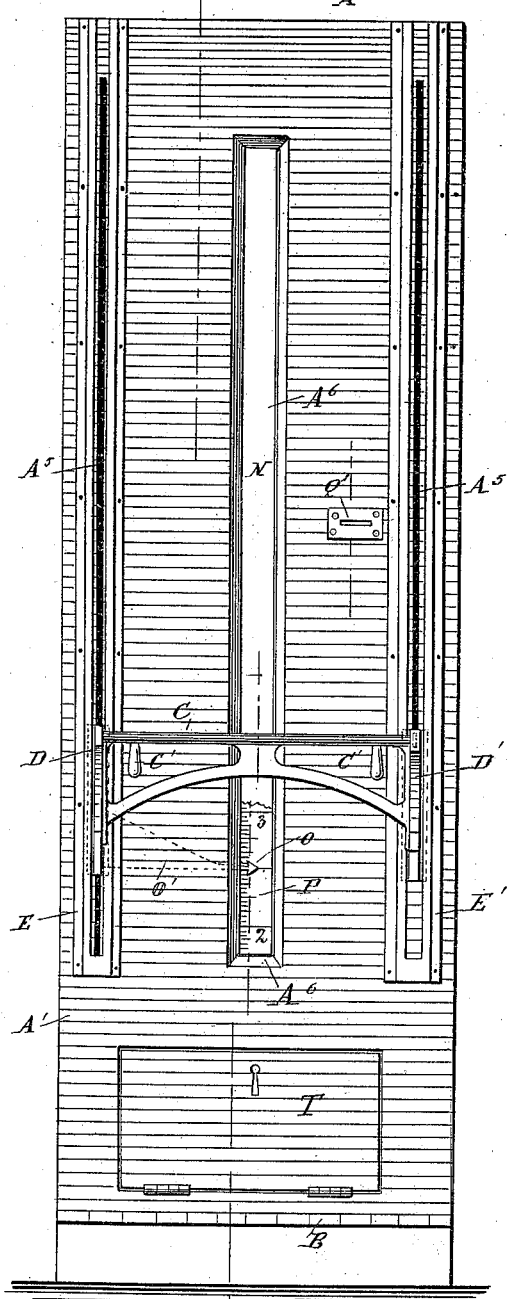
WITNESSES:
INVENTOR: C. R. Williams
BY Munn & Co.
ATTORNEYS.

(No Model.) 4 Sheets—Sheet 2.
C. R. WILLIAMS.
COIN CONTROLLED HEIGHT MEASURING MACHINE.
No. 383,608. Patented May 29, 1888.
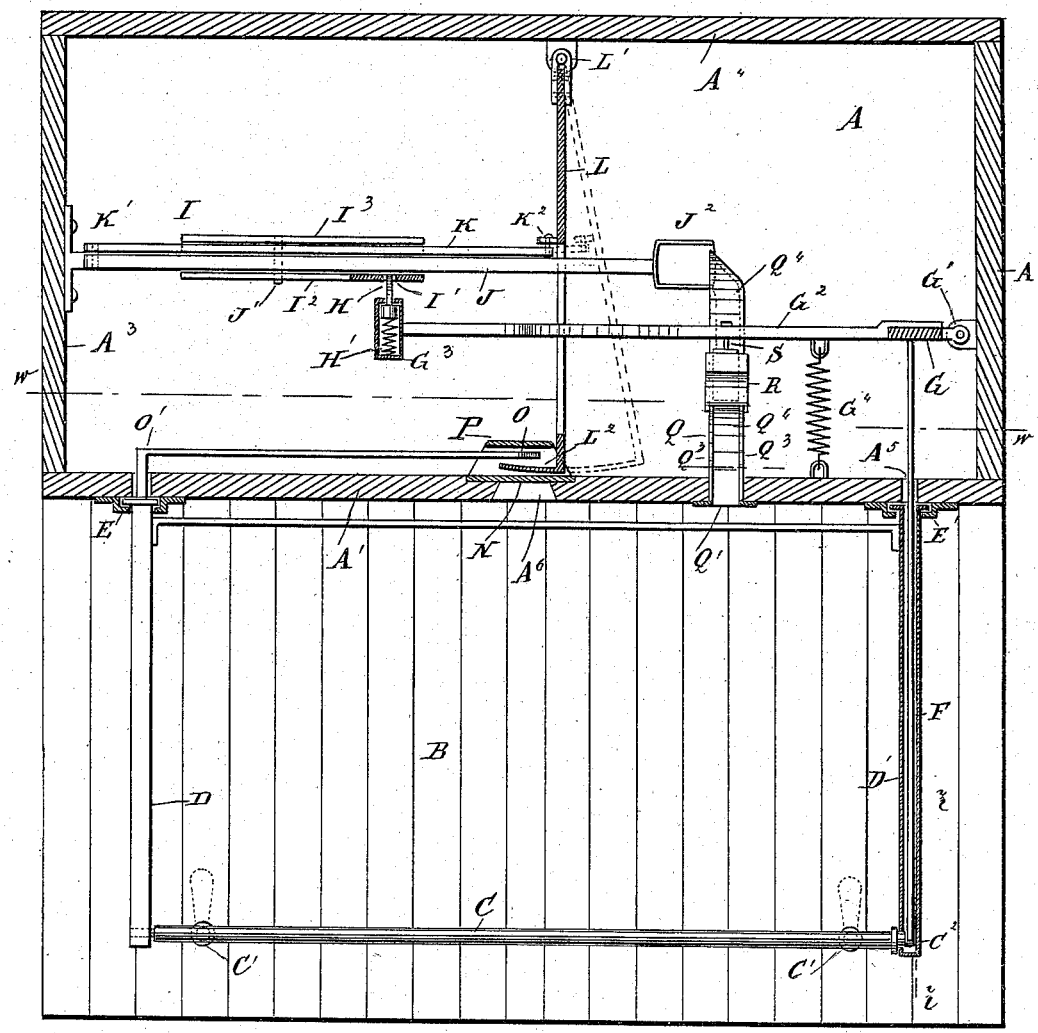
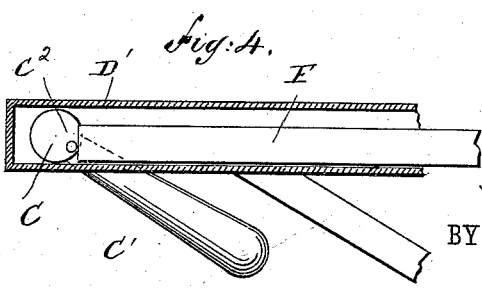
WITNESSES:
INVENTOR:
C. R. Williams.
BY Munn & Co.
ATTORNEYS.

(No Model.) 4 Sheets—Sheet 3.
C. R. WILLIAMS.
COIN CONTROLLED HEIGHT MEASURING MACHINE.
No. 383,608. Patented May 29, 1888.
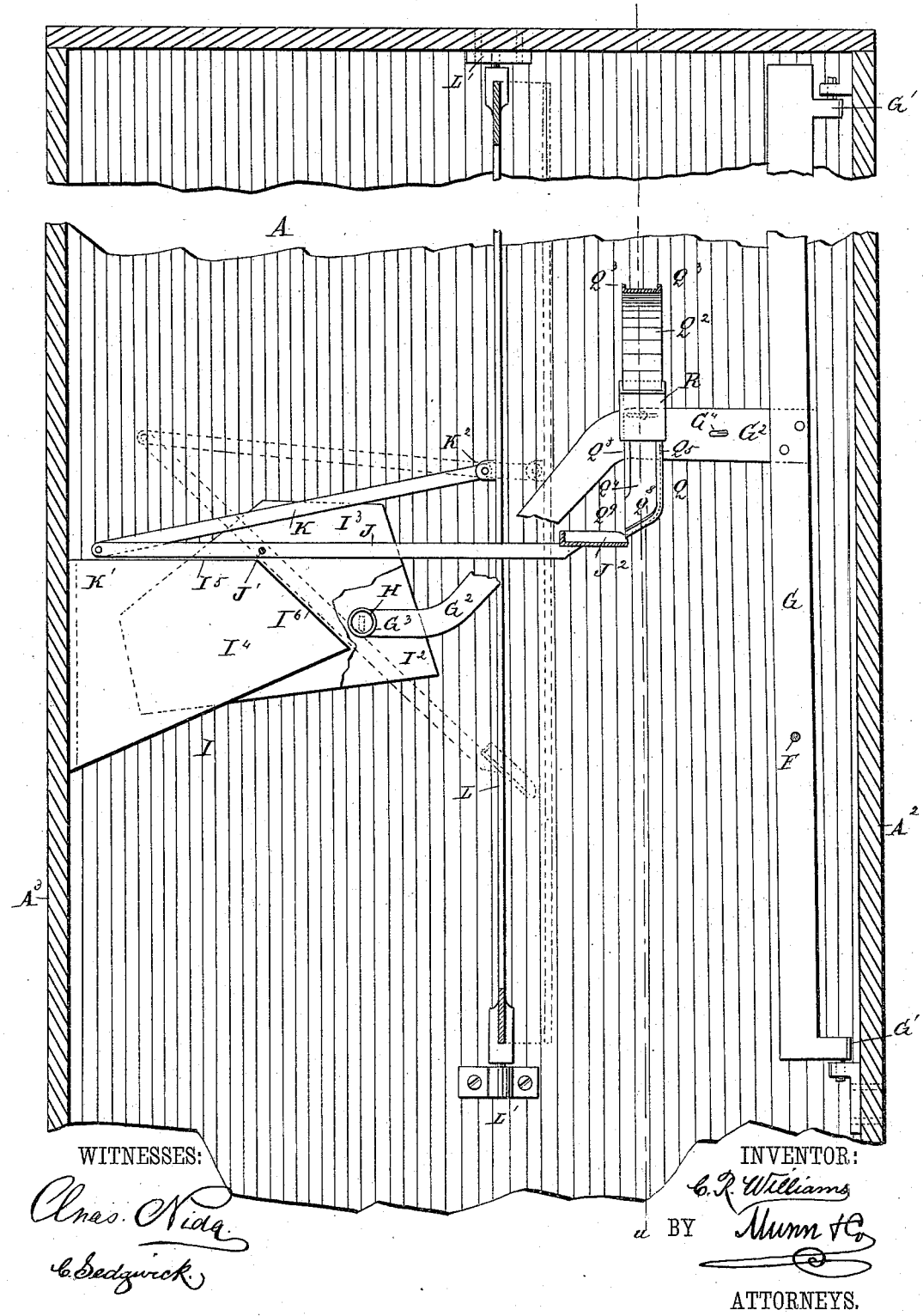
WITNESSES:
INVENTOR:
C. R. Williams
BY Munn & Co.
ATTORNEYS.

(No Model.) 4 Sheets—Sheet 4.
C. R. WILLIAMS.
COIN CONTROLLED HEIGHT MEASURING MACHINE.
No. 383,608. Patented May 29, 1888.
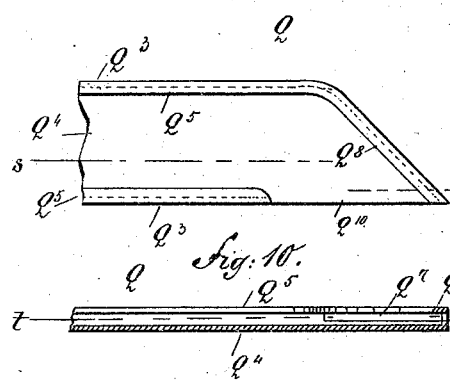
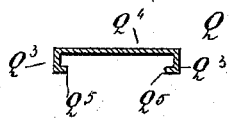
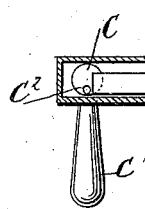
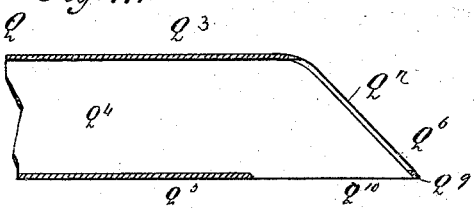
WITNESSES:
Chas. Nida
C. Sedgwick
INVENTOR:
C. R. Williams
BY Munn & Co.
ATTORNEYS.
N. PETERS, Photo-Lithographer, Washington, D. C.

United States Patent Office.

CHARLES R. WILLIAMS, OF NEWARK, NEW YORK.

COIN-CONTROLLED HEIGHT-MEASURING MACHINE.

SPECIFICATION forming part of Letters Patent No. 383,608, dated May 29, 1888.

Application filed February 8, 1888. Serial No. 263,390. (No model.)

*To all whom it may concern:*

Be it known that I, CHARLES R. WILLIAMS, of Newark, in the county of Wayne and State of New York, have invented a new and Improved Coin-Operated Measuring-Machine, of which the following is a full, clear, and exact description.

The invention relates to machines in which the introduction of a coin of a given size and weight permits the machine to automatically determine the height of a person.

The object of the invention is to provide a new and improved machine for automatically measuring the height of a person when he introduces a coin into the machine.

The invention consists of a vertically-sliding pointer moved up or down by a person desiring to determine his height, and of a plate held in front of the pointer and operated on by the introduction of a coin of a given size and weight.

The invention also consists of certain parts and details and combinations of the same, as will be fully described hereinafter, and then pointed out in the claims.

Reference is to be had to the accompanying drawings, forming a part of this specification, in which similar letters of reference indicate corresponding parts in all the figures.

Figure 1 is a front elevation of the improvement. Fig. 2 is a sectional side elevation of the same on the line $x\,x$ of Fig. 1. Fig. 3 is an enlarged sectional plan view of the improvement on the line $y\,y$ of Fig. 2. Fig. 4 is an enlarged sectional side elevation on the line $z\,z$ of Fig. 3. Fig. 5 is a sectional front elevation of the improvement on the line $w\,w$ of Fig. 3. Fig. 6 is a sectional side elevation of the improvement on the line $u\,u$ of Fig. 5. Fig. 7 is an enlarged cross-section of the coin-slide on the line $v\,v$ of Fig. 6. Fig. 8 is a like view of the same on the line $r\,r$ of Fig. 6. Fig. 9 is an enlarged bottom view of the lower end of the coin-slide. Fig. 10 is an inverted sectional side elevation of the same on the line $s\,s$ of Fig. 9, and Fig. 11 is an inverted sectional plan view of the lower end of the same on the line $t\,t$ of Fig. 10.

On the front of a suitably-constructed box, A, is formed a stationary platform, B, on which stands the person desirous of determining his height. Above the platform B is held a transverse rod, C, adapted to slide vertically and to rest on the top of the head of the party standing on the platform B. The rod C is provided with downwardly-extending handles C', and is mounted to turn in bearings formed in the outer ends of the brackets D and D', held to slide in the guides E and E', respectively, fastened on the front A' of the box A.

On one end of the rod C is formed an eccentric-pin, $C^2$, adapted to engage the outer end of a rod, F, held to slide horizontally in the hollow bracket D', and passing through a vertical slot, $A^5$, formed in the front A' of the box A. The inner end of the rod F rests against a vertical bar, G, pivoted at G' to the side $A^2$ of the box A. The bar G extends throughout nearly the entire height of the box A, so that the inner end of the rod F, when moved up and down, is always in contact with the said bar G. From the latter extends transversely an arm, $G^2$, acted upon by a spring, $G^4$, secured by one end to the said arm, and by its other end to the front A' of the box A. Said arm $G^2$ is provided at its outer end with a barrel, $G^3$, supporting a locking-bolt, H, against which operates a spring, H', held in the said barrel $G^3$. The spring H' has the tendency to hold the locking-bolt H in its outermost position, at the same time permitting an inward yielding movement of the bolt. The latter is adapted to pass through an aperture, I', formed in one of the side plates, $I^2$, of a bracket, I, secured to the side $A^3$ of the box A. Said bracket I is provided with a plate, $I^3$, which is similar in shape to the plate $I^2$, and is held opposite to the same. The two plates $I^2$ and $I^3$ are fastened to a central plate, $I^4$, having a horizontal top edge, $I^5$, and a downwardly-extending inclined edge, $I^6$, at its front. Between the two plates $I^2$ and $I^3$ is held a lever, J, pivoted at J' on the said plates $I^2$ and $I^3$ in such a manner that when the said lever J is in a horizontal position its rear end rests on the horizontal top edge, $I^5$, of the center plate, $I^4$, and when the said lever J is in its lowermost position, as shown in dotted lines in Fig. 5, the front end of the said lever rests on the downwardly-inclined edge $I^6$ of the said center plate, $I^4$.

On the extreme front end of the lever J is formed the coin-pan $J^2$, and to the rear end of the said lever J is pivotally connected at K' the link K, pivotally connected at K² to the bar L, hinged at L' to the rear wall, A⁴, of the box A. The bar L carries at its front end an angular plate or flange, L², adapted to swing behind a glass, N, secured to the front A' of the box A over a slot, A⁶, extending in the middle of the front of the said box A from the top to the bottom. Behind the glass N, and behind the plate L², is held a pointer, O, secured to an arm, O', fastened to the bracket D, before described, and directly behind the pointer O is held a vertical graduated bar, P, secured to the box A, and having graduations representing feet or any other suitable scale of measurement, said scale counting from the top of the platform B, as is plainly shown in Fig. 1. It will be seen that when the plate L² is in the position shown in full lines in Fig. 3 the pointer O and the graduated scale-bar P cannot be seen from the outside through the slot A⁶ and the glass N; but when the said flange L² is in the position shown in dotted lines in the same figure the pointer O is plainly seen indicating a certain point on the graduated bar P.

Into the coin-pan J² discharges the coin-chute Q, secured by its upper end to the front A' of the box A, which front A' is provided with a money-slot, Q', through which the coin is introduced into the coin-chute Q. The latter extends inward and downward from the front A', and is provided in its upper part with the bottom Q², supporting the two side flanges, Q³ Q³. On the lower end of the bottom Q² of the chute Q is secured a collar, R, having a horizontal hollow projection, R', in which is held to slide a retaining-plate, S, secured to the arm G², before mentioned. The lower part of the chute Q is bottomless, but is provided with a top plate, Q⁴, which supports the side flanges, Q³, above mentioned, each being provided with an inwardly-extending rib or flange, Q⁵. (Plainly shown in Figs. 8, 9, and 10.)

The coin which is to operate the machine is previously determined on, and the chute Q is correspondingly constructed according to the size of the said coin, the distance between the side flanges, Q³, being equal to the diameter of the coin, and the distance between the ribs Q⁵ and the top Q⁴ being equal to the thickness of the coin, so that the latter, on being introduced through the money-slot Q', falls on the bottom Q² between the side flanges, Q³, and slides down on the said bottom until it passes on the ribs Q⁵, which also permit the coin to slide downward. One of the side flanges, Q³, and its rib Q⁵ stops a short distance before it reaches the lower end of the top plate, Q⁴, while the other flange Q³, with its rib Q⁵, is continued into the inwardly-bent end Q⁶, having an opening or slot, Q⁷, near its bottom edge, as is plainly shown in Figs. 10 and 11, so that only a small rib of the said end Q⁶ is left standing near the lower end of the top plate, Q⁴. The corresponding rib Q⁵ of the side flange, Q³, is also continued into the rib Q⁸, which extends across the slot Q⁷, and is supported at Q⁹ by the outer end of the bent end Q⁶. Thus between this part Q⁹ and the lower end of one side flange Q³ is formed an opening, Q¹⁰, which discharges directly on the money-pan J².

It will be seen that when a piece of money of the same diameter as the coin previously determined on, but of less thickness than the said coin, is passed into the money-slot Q', the said coin can pass down the chute Q and out through the slot or opening Q⁷, and consequently will not fall on the money-pan J²; hence the coin inserted in the money-slot Q' must be the one previously determined on; otherwise the machine will not operate.

In the lower part of the front A' of the box A is formed a door, T, provided with a suitable lock, and serving for the removal of the coins deposited in the box A.

The operation is as follows: The party desirous of determining his height steps on the platform B and inserts a coin of the proper size and weight into the slot Q', so that the coin slides down the chute Q until it rests against the inner end of the retaining-plate S. The operator then moves the brackets D D' upward and then downward until the transverse rod C rests on the top of his head. The operator then takes hold of one or both of the handles C' and moves the same inward into the position shown in Fig. 4, whereby the eccentric-pin C² on the said rod C imparts an inwardly-sliding movement to the rod F, and the latter pressing against the vertical bar G causes a rearwardly-swinging movement of the same, so that its arm G² likewise swings in the same direction until the barrel G³ rests on the plate I² and the bolt H passes into the aperture I'. The retaining-plate S, which is secured to the arm G² of the said bar G, is also moved rearward, whereby the chute Q becomes free and the coin can pass downward until it reaches the lower end of the chute Q, and then turns nearly at right angles, passing out through the opening Q¹⁰ and falling on the money-pan J², held in a horizontal position. The weight of the coin now causes the pan J² and its lever J to swing downward into the position shown in dotted lines in Fig. 5, whereby the coin slides out of the pan J² and falls on the bottom of the box A. The downward movement of the pan J² causes the rear end of the lever J to rise, so that the link K, connected with the said rear end, exerts a sidewise pressure against the plate L, whereby the latter is swung to the right into the position shown in dotted lines in Fig. 3. This sidewise swinging movement of the bar L throws its flange L² to one side, whereby the pointer O and the graduated scale P directly behind it become free and visible to the operator standing on the platform B. The pointer O is in line with the lower edge of the rod C, and as the pointer O is connected with the bracket D and moves with the same, it will be seen that the pointer indicates the distance on the graduated bar P from the platform B to the lower edge of the rod C—that is, the height of the person standing on the platform and having the rod C resting on the top of his head. The party can thus conveniently read off his height as indicated by the pointer O on the graduated bar P. When the lever J swings downward from its horizontal position into the position above described, it passes over the inclined edge of the spring-bolt H and presses the latter into the barrel G³ until the top edge of the said lever J has passed below the bottom of the said bolt H, after which the spring H' presses the bolt H outward on the top edge of the lever J. Said lever J rests on the inclined edge l⁶ of the central plate, I⁴, and is locked in position on the same by the spring-bolt H. This locking of the lever J prevents the bar L and its flange L² from returning to their former position until the operator, after having read off his height, moves the handles C' back to their former position, as shown in Figs. 1, 2, and 6. The spring G⁴ now exerts its pressure on the arm G² and causes the same to swing toward the front, whereby the rod F is moved outward, the retaining-plate S is moved inward, and assumes its former position, as shown in Fig. 6, and at the same time the bolt H, held in the barrel G³, secured on the bar G², is withdrawn from the top edge of the lever J, so that the latter can again swing upward into its horizontal position, as shown in full lines in Fig. 5. The upward movement of the front part of the lever J causes the bar L to swing sidewise by its connection with the said lever by means of the link K, so that the flange L² again passes in front of the pointer O and the graduated bar P.

It is understood that when the coin passes into the pan J² while the latter is in its horizontal position, as shown in full lines in Fig. 5, the said coin slightly overbalances the rear end of the lever J, the link K, and the power necessary for moving the bar L forward or backward, so that when the coin slides off of the pan J², when the latter is in its lowest position, and the bolt H is removed, then the lever J returns to its original position and carries with it the parts connected with the said lever.

It will be seen that only the proper coin, when introduced into the chute Q, will fall on the money-pan J², and when a person introduces another coin into the slot Q' the said coin will slide down on the bottom Q² until it rests on the retaining-plate S, which, when moved outward, permits said coin to slide downward in the chute Q, and in case the coin is of less diameter than the distance between the ribs Q⁵ the said coin will drop into the box A at the lower end of the bottom Q². If the coin is thinner than the distance between the ribs Q⁵ and the top plate, Q⁴, it will pass down and drop through the opening Q⁷ without touching the pan J². Thus coins which are not of the proper size can be passed into the chute Q and collected in a box, A, but will not operate the mechanism for determining the height of the person.

Having thus fully described my invention, I claim as new and desire to secure by Letters Patent—

1. The combination, with a pointer inclosed in a box, brackets held to slide on the outside of the box and supporting the said pointer, and a graduated scale on which said pointer indicates, of a plate adapted to swing in front of the said pointer and scale, substantially as shown and described.

2. The combination, with a pointer adapted to slide vertically and a graduated scale on which the said pointer indicates, of a plate adapted to swing in front of the said pointer, and a lever connected with the said plate and operated by a coin, so that the introduction of the proper coin imparts a swinging motion to the said lever, whereby the said plate swings away from the said pointer and scale, substantially as shown and described.

3. The combination, with a box and a fixed platform on the front of the said box, of brackets held to slide on the front of the said box, a pointer supported by the said brackets on the inside of the box, a graduated scale secured in the said box behind the said pointer, the graduation on the said scale counting from the top of the said platform, and a hinged plate or flange adapted to swing in front of the said pointer on the inside of the box, substantially as shown and described.

4. The combination, with a box and a fixed platform on the front of the said box, of brackets held to slide on the front of the said box, a pointer supported by the said brackets on the inside of the box, a graduated scale secured in the said box behind the said pointer, the graduation of the said scale counting from the top of the said platform, a hinged plate or flange adapted to swing in front of the said pointer on the inside of the box, and a mechanism for operating the said plate by the introduction of a coin into the said box, substantially as shown and described.

5. The combination, with a box and a fixed platform on the front of the said box, of brackets held to slide on the front of the said box, a pointer supported by the said brackets on the inside of the said box, a graduated scale secured in the said box behind the said pointer, a hinged plate or flange adapted to swing in front of the said pointer on the inside of the said box, a lever connected with the said plate or flange, and a chute secured to the front of the said box and discharging on the said lever, so that the introduction of the proper coin into the said chute operates the said lever and causes said plate or flange to swing away from the front of the said pointer, substantially as shown and described.

6. The combination, with a box and a fixed platform on the front of the said box, of brackets held to slide on the front of the said box, a pointer supported by the said brackets on the inside of the said box, a graduated scale secured in the said box behind the said pointer, a plate or flange adapted to swing in front of the said pointer on the inside of the said box, a lever connected with the said plate or flange, and a spring for locking the said lever in position, substantially as shown and described.

7. The combination, with a box and a fixed platform on the front of the said box, of brackets held to slide on the front of the said box, a pointer supported on the said brackets on the inside of the said box, a graduated scale secured in the said box behind the said pointer, a hinged plate or flange adapted to swing in front of the said pointer, a lever operated by a coin and connected with the said plate or flange, a bolt for locking the said lever in position, and an arm carrying the said bolt and operated on from the outside of the said box, substantially as shown and described.

8. The combination, with a chute, of a retaining-plate held to slide in the said chute, an arm carrying the said retaining-plate and secured to a vertical hinged bar, and a rod abutting against the said bar and having a sliding movement, so as to impart a swinging movement to the said bar and its arm, substantially as shown and described.

9. The combination, with a chute, of a retaining-plate held to slide in the said chute, an arm carrying the said retaining-plate and secured to a vertical hinged bar, a rod abutting against the said bar and having a sliding movement, so as to impart a swinging movement to the said bar and its arm, and a spring acting on the said arm for imparting a return motion to the said bar and its arm, substantially as shown and described.

10. The combination, with a vertical hinged bar provided with an arm carrying a retaining-plate and a locking-bolt, of a rod abutting against the said bar, an eccentric-pin operating against the said rod, and a rod mounted to turn and carrying the said eccentric-pin, substantially as shown and described.

11. The combination, with a vertical hinged bar provided with an arm carrying a retaining-plate and a locking-bolt, of a rod abutting against the said bar, an eccentric-pin operating against the said rod, a rod mounted to turn and carrying the said eccentric-pin, and handles held on the said last-named rod for turning it in its bearings, substantially as shown and described.

12. In a coin-operated measuring-machine, a chute provided in its lower part with a top plate, two side flanges, each having an inwardly-extending rib, and an end flange having an opening for the passage of improper coins, substantially as shown and described.

13. In a coin-operated measuring-machine, the combination, with a money-pan held at the end of a lever, of a money-chute discharging at its lower end at one side on the said pan, said chute being provided at its lower end with a flange having an opening for discharging the proper coins on the said pan, and having a second opening for carrying the improper coins over the said pan, substantially as shown and described.

CHARLES R. WILLIAMS.

Witnesses:
ELIAB T. GRANT,
FRED. M. PHELPS.